United States Patent [19]
Miyoshi et al.

[11] Patent Number: 5,911,960
[45] Date of Patent: *Jun. 15, 1999

[54] PROCESS FOR PURIFYING EXHAUST GASES

[75] Inventors: Naoto Miyoshi, Nagoya; Shinichi Matsumoto, Aichi-gun; Tsuneyuki Tanizawa, Toyota; Satoshi Iguchi, Mishima; Toshiaki Tanaka, Numazu; Shinichi Takeshima, Susono; Takaaki Kanazawa, Setagaya-ku; Takahiro Hayashi, Toyota; Motohisa Saiki, Aichi-gun; Kazuhiko Dohmae, Aichi-gun; Kiyoshi Yamazaki, Aichi-gun; Tadashi Suzuki, Seto; Koichi Kasahara; Syuji Tateishi, both of Ogasa-gun, all of Japan

[73] Assignees: Toyota Jidosha Kabushiki Kaisha; Kabushiki Kaisha Toyota Chuo Kenkyusho, both of Aichi-ken; Cataler Industrial Co., Ltd., Shizuoka-ken, all of Japan

[*] Notice: This patent issued on a continued prosecution application filed under 37 CFR 1.53(d), and is subject to the twenty year patent term provisions of 35 U.S.C. 154(a)(2).

[21] Appl. No.: 08/544,260

[22] Filed: Oct. 17, 1995

Related U.S. Application Data

[63] Continuation of application No. 08/179,670, Jan. 11, 1994, abandoned.

[30] Foreign Application Priority Data

Jan. 11, 1993 [JP] Japan ................................. 5-002491
Aug. 20, 1993 [JP] Japan ................................. 5-206664
Sep. 24, 1993 [JP] Japan ................................. 5-238461

[51] Int. Cl.⁶ ........................... B01D 53/94; B01D 53/60
[52] U.S. Cl. .................................. 423/213.5; 423/213.2; 423/239.1
[58] Field of Search .................... 423/213.5, 213.2, 423/239.1; 502/326, 330

[56] References Cited

U.S. PATENT DOCUMENTS

| | | | |
|---|---|---|---|
| 3,931,050 | 1/1976 | Asano et al. | 423/213.5 |
| 4,294,726 | 10/1981 | Bozon et al. | 423/213.5 |
| 4,369,132 | 1/1983 | Kinoshita et al. | 423/213.5 |
| 4,480,050 | 10/1984 | Brennan | 423/213.5 |
| 4,497,783 | 2/1985 | Barber | 502/330 |
| 4,528,279 | 7/1985 | Suzuki et al. | 502/200 |
| 4,654,319 | 3/1987 | Kim et al. | 502/304 |
| 4,682,577 | 7/1987 | Kato et al. | 123/492 |
| 4,755,499 | 7/1988 | Neal et al. | 502/415 |
| 4,760,044 | 7/1988 | Joy et al. | 423/213.5 |
| 4,780,447 | 10/1988 | Kim et al. | 502/304 |
| 4,808,564 | 2/1989 | Matsumoto et al. | 502/303 |
| 4,849,398 | 7/1989 | Takada et al. | 502/303 |
| 4,868,148 | 9/1989 | Henki et al. | 423/213.5 |
| 4,904,633 | 2/1990 | Ohata et al. | 423/213.5 |
| 4,963,521 | 10/1990 | Engler et al. | 423/213.5 |
| 5,024,985 | 6/1991 | Koberstein et al. | 423/213.5 |
| 5,041,407 | 8/1991 | Williamson et al. | 423/213.5 |
| 5,075,274 | 12/1991 | Kiyohide et al. | 502/303 |
| 5,075,275 | 12/1991 | Murakami et al. | 423/213.5 |
| 5,179,059 | 1/1993 | Domesle et al. | 502/303 |
| 5,185,305 | 2/1993 | Subramanian et al. | 502/65 |
| 5,208,202 | 5/1993 | Muramatsu et al. | 423/213.2 |
| 5,208,203 | 5/1993 | Horiuchi et al. | 502/302 |
| 5,208,205 | 5/1993 | Subramanian et al. | 423/213.5 |
| 5,236,879 | 8/1993 | Inoue et al. | 502/73 |
| 5,248,650 | 9/1993 | Sekiba et al. | 423/213.5 |
| 5,268,346 | 12/1993 | Ino et al. | 502/348 |
| 5,271,916 | 12/1993 | Vanderborgh et al. | 423/246 |
| 5,294,421 | 3/1994 | Muraki et al. | 423/213.5 |
| 5,388,406 | 2/1995 | Takeshima et al. | 423/212 |
| 5,402,641 | 4/1995 | Katoh et al. | 60/277 |
| 5,412,945 | 5/1995 | Katoh et al. | 60/297 |
| 5,575,983 | 11/1996 | Suzuki et al. | 423/239.1 |

FOREIGN PATENT DOCUMENTS

| | | |
|---|---|---|
| 0 170 841 | 2/1986 | European Pat. Off. . |
| 0 257 983 A2 | 3/1988 | European Pat. Off. . |
| 0 298 351 | 1/1989 | European Pat. Off. . |
| 0 387 611 | 9/1990 | European Pat. Off. . |
| 0 439 010 | 7/1991 | European Pat. Off. . |
| 0 441 173 A1 | 8/1991 | European Pat. Off. . |
| 0 485 180 | 5/1992 | European Pat. Off. . |
| 0 488 250 A1 | 6/1992 | European Pat. Off. . |
| 0 507 590 | 10/1992 | European Pat. Off. . |
| 0 525 677 A1 | 2/1993 | European Pat. Off. . |
| 0 532 024 A1 | 3/1993 | European Pat. Off. . |
| 0 556 554 | 8/1993 | European Pat. Off. . |
| 2 279 445 | 2/1976 | France . |
| 2518536 | 10/1975 | Germany . |
| 3803122 | 7/1979 | Germany ...................... 423/213.5 |
| 37 26 580 A1 | 3/1988 | Germany . |
| 37 43 626 A1 | 7/1988 | Germany . |
| 40 08 371 | 9/1990 | Germany . |
| 53-19986 | 2/1978 | Japan ............................ 423/213.5 |
| 62-106826 | 5/1987 | Japan . |
| 62-97630 | 5/1987 | Japan . |
| 5-168860 | 7/1993 | Japan . |
| 5-317652 | 12/1993 | Japan . |
| 6-304476 | 11/1994 | Japan . |
| 92 04965 | 4/1992 | WIPO . |

OTHER PUBLICATIONS

Official Translation of Saito et al., Japan Kokai 62–106826, First Published 1987.

*Primary Examiner*—Michael Lewis
*Assistant Examiner*—Peter DiMauro
*Attorney, Agent, or Firm*—Oliff & Berridge, PLC

[57] ABSTRACT

A catalyst for purifying exhaust gases includes a porous support, at least one catalyst ingredient selected from Pt and Pd, and additional ingredients including (1) at least two rare-earth elements including La, (2) at least one rare-earth element including La and at least one transition element selected from Fe, Ni, Co and Mn, (3) at least two alkali metals, (4) at least one alkali metal and at least one rare-earth element including La, (5) at least one alkali metal and at least one transition element selected from Fe, Ni, Co and Mn, (6) at least two alkaline-earth metals, (7) at least one alkaline-earth metal and at least one rare-earth element including La, or (8) Ba, Li, La, Ce and Zr. A process for purifying an exhaust gas, by contacting the catalyst with an exhaust gas, is also provided.

6 Claims, No Drawings

PROCESS FOR PURIFYING EXHAUST GASES

This is a Continuation of application Ser. No. 08/179,670 filed Jan. 11, 1994, now abandoned.

BACKGROUND OF THE INVENTION

1. Field of the Invention

The present invention relates to a catalyst for purifying exhaust gases and a process for purifying exhaust gases. More particularly, it relates to the catalyst and the process which can efficiently purify nitrogen oxides ($NO_x$) in the exhaust gases which contain oxygen in excessive amounts required for oxidizing carbon monoxide (CO) and hydrocarbons (HC) therein.

2. Description of Related Art

As catalysts for purifying automotive exhaust gases, there have been employed 3-way catalysts so far which oxidize CO and HC and reduces $NO_x$ simultaneously to purify the exhaust gases. For example, the 3-way catalysts have been known widely which comprise a heat resistant support formed of cordierite, a catalyst carrier layer formed of gamma-alumina and disposed on the support, and a noble metal selected from the group consisting of Pt, Pd and Rh and loaded on the catalyst carrier layer.

The purifying performance of the 3-way catalysts for purifying exhaust gases depends on the air-fuel ratio (A/F) of automotive engine. For instance, when the air-fuel ratio is large, i.e., when the fuel concentration is small (or on the fuel-lean side), the oxygen concentration is large. Accordingly, the oxidation reactions purifying CO and HC are active, but the reduction reactions purifying $NO_x$ are inactive. On the other hand, when the air-fuel ratio is small, i.e., when the fuel concentration is more (or on the fuel-rich side), the oxygen concentration is small. Accordingly, the oxidation reactions are inactive, but the reduction reactions are active.

Moreover, when driving automobiles, especially when driving automobiles in urban areas, the automobiles are accelerated and decelerated frequently. Consequently, the air-fuel ratio varies frequently in the range of from the values adjacent to the stoichiometric point (or the ideal air-fuel ratio) to the fuel-rich side. In order to satisfy the low fuel consumption requirement during the driving in urban areas, it is necessary to operate the automobiles on the fuel-lean side where the air-fuel mixture containing oxygen as excessive as possible is supplied to the engines. Hence, it has been desired to develop a catalyst which is capable of adequately purifying $NO_x$ on the fuel-lean side (i.e., in the oxygen-rich atmospheres).

Under the circumstances, as set forth in Japanese Unexamined Patent Publication (KOKAI) No. 5-168860, the applicants of the present invention disclosed a catalyst with rare-earth elements including La, and Pt loaded. With the catalyst, $NO_x$ is adsorbed on the rare-earth elements during the the fuel-lean side (i.e., in the oxygen-rich atmospheres) driving, and it is purified by reacting with the reducing gases such as HC and the like, when the automobiles are driven under the air-fuel ratios at the stoichiometric point or on the fuel-rich side (i.e., in the oxygen-lean atmospheres). Thus, the catalyst is superb in the purifying performance of $NO_x$ even on the fuel-lean side (i.e., in the oxygen-rich atmospheres). The catalyst is believed to provide the advantageous effect because the rare-earth elements are loaded on the support in a form of the simple oxides and the simple oxides of the rare-earth elements and they react with $NO_x$ so as to produce the nitrates thereof.

However, the exhaust gases usually contain $SO_2$ which are produced by burning sulfur (S) contained in the fuel. Further, the catalyst ingredient oxidizes $SO_2$ to $SO_3$ in the oxygen-rich atmospheres (i.e., on the fuel-lean side). Then, $SO_3$ reacts readily with water contained in the exhaust gases to produce sulfuric acid. The sulfate ions or the sulfite ions react with rare-earth elements to produce the sulfates or the sulfites incapable of adsorbing $NO_x$. Accordingly, the catalyst is not completely satisfactory in terms of the $NO_x$ purifying performance and the durability of the performance at elevated temperatures.

SUMMARY OF THE INVENTION

The present invention has been developed in view of the aforementioned circumstances. It is therefore an object of the present invention to efficiently purify $NO_x$ in exhaust gases containing oxygen in excessive amounts and improve the catalyst in terms of the durability of the $NO_x$ purifying performance at elevated temperatures.

In accordance with the present invention, a catalyst or a process comes to be able to carry out the above object, and they can simultaneously purify carbon monoxide, hydrocarbons and nitrogen oxides in exhaust gases in oxygen-rich atmospheres, thereby purifying the exhaust gases. It is one of the features of the present invention that novel and specific ingredients are loaded on the catalyst for purifying exhaust gases which is brought into contact with the exhaust gases containing oxygen in excessive amounts. Unless otherwise specified, the loading amounts of the catalyst ingredient or the following ingredients mean the amounts thereof loaded on a unit volume of a porous support and expressed in grams or moles with respect the unit volume (e.g., 1 liter).

First of all, at least one catalyst ingredient selected from the group consisting of platinum (Pt) and palladium (Pd) is loaded on a catalyst according to the present. It is preferred to load rhodium (Rh) thereon in addition to Pt and Pd. The loading amount of the catalyst ingredient can preferably fall in a range of from 0.1 to 10 grams/liter when one of the catalyst ingredients are loaded thereon independently, and it can preferably fall in a range of from 0.1 to 10 grams/liter in total when they are combined and loaded thereon. The loading amount can further preferably fall in a range of 0.5 to 3.0 grams/liter.

In a first aspect of the present invention, a catalyst according to the present invention comprises, in addition to the above-described catalyst ingredients, at least two ingredients loaded thereon. The ingredients are selected from the group consisting of rare-earth elements including La, and they can preferably be lanthanides such as La, Pr, Nd and Sm. The loading amounts of the two ingredients can preferably fall in a range of from 0.05 to 2.0 moles/liter in total. When the ingredients are loaded in an amount of less than the lower limit, the durability of the $NO_x$ purifying performance deteriorates at elevated temperatures. When the ingredients are loaded in an amount more than the upper limit, the advantageous effects resulting from the loading saturate, and the porous support diminishes the surface area. Hence, it is unpreferable to load the ingredients in such loading amounts deviating from the range.

In a second aspect of the present invention, a catalyst according to the present invention comprises, in addition to the above-described catalyst ingredients, at least one first ingredient loaded thereon, and at least one second ingredient loaded thereon. The first ingredient is selected from the group consisting of rare-earth elements including La. The second ingredient is selected from the group consisting of transition elements such as Fe, Ni, Co and Mn. The rare-earth elements including La can preferably be lanthanides such as La, Pr, Nd and Sm. The loading amount of the first ingredient (or the rare-earth element ingredient) can preferably fall in a range of from 0.05 to 1.0 mole/liter. The loading amount of the second ingredient (or the transition element ingredient) can preferably fall in a range of from 0.05 to 1.0 mole/liter. The loading amount of the first ingredient and the loading amount of the second ingredient can preferably fall in a range of from 0.1 to 2.0 moles/liter in total. When the first ingredient and the second ingredient are loaded in an amount of less than the lower limit, the durability of the $NO_x$ purifying performance deteriorates at elevated temperatures. When the first ingredient and the second ingredient are loaded in an amount more than the upper limit, the advantageous effects resulting from the loading saturate, and the porous support diminishes the surface area. Hence, it is unpreferable to load the first ingredient and the second ingredient in such loading amounts deviating from the range.

In a third aspect of the present invention, a catalyst according to the present invention comprises, in addition to the above-described catalyst ingredients, at least two ingredients loaded thereon. The ingredients are selected from the group consisting of alkali metals, and they can preferably be K, Li, Na, Rb and Cs. The loading amounts of the two ingredients (or the two alkali metal ingredients) can preferably fall in a range of from 0.05 to 2.0 moles/liter in total. When the ingredients are loaded in an amount of less than the lower limit, the durability of the $NO_x$ purifying performance deteriorates at elevated temperatures. When the ingredients are loaded in an amount more than the upper limit, the advantageous effects resulting from the loading saturate, and the porous support diminishes the surface area. Hence, it is unpreferable to load the ingredients in such loading amounts deviating from the range.

In a fourth aspect of the present invention, a catalyst according to the present invention comprises, in addition to the above-described catalyst ingredients, at least one first ingredient loaded thereon, and at least one second ingredient loaded thereon. The first ingredient is selected from the group consisting of alkali metals. The second ingredient is selected from the group consisting of rare-earth elements including La. The alkali metals can preferably be K, Li, Na, Rb and Cs. The rare-earth elements including La can preferably be lanthanides such as La, Pr, Nd and Sm. The loading amount of the first ingredient (or the alkali metal ingredient) can preferably fall in a range of from 0.05 to 1.0 mole/liter. The loading amount of the second ingredient (or the rare-earth element ingredient) can preferably fall in a range of from 0.05 to 1.0 mole/liter. The loading amount of the first ingredient and the loading amount of the second ingredient can preferably fall in a range of from 0.1 to 2.0 moles/liter in total. When the first ingredient and the second ingredient are loaded in an amount of less than the lower limit, the durability of the $NO_x$ purifying performance deteriorates at elevated temperatures. When the first ingredient and the second ingredient are loaded in an amount more than the upper limit, the advantageous effects resulting from the loading saturate, and the porous support diminishes the surface area. Hence, it is unpreferable to load the first ingredient and the second ingredient in such loading amounts deviating from the range.

In a fifth aspect of the present invention, a catalyst according to the present invention comprises, in addition to the above-described catalyst ingredients, at least one first ingredient loaded thereon, and at least one second ingredient loaded thereon. The first ingredient is selected from the group consisting of alkali metals, and it can preferably be K, Li, Na, Rb and Cs. The second ingredient is selected from the group consisting of transition elements, and it can preferably be Fe, Ni, Co and Mn. The loading amount of the first ingredient (or the alkali metal ingredient) can preferably fall in a range of from 0.05 to 1.0 mole/liter. The loading amount of the second ingredient (or the transition element ingredient) can preferably fall in a range of from 0.05 to 1.0 mole/liter. The loading amount of the first ingredient and the loading amount of the second ingredient can preferably fall in a range of from 0.1 to 2.0 moles/liter in total. When the first ingredient and the second ingredient are loaded in an amount of less than the lower limit, the durability of the $NO_x$ purifying performance deteriorates at elevated temperatures. When the first ingredient and the second ingredient are loaded in an amount more than the upper limit, the advantageous effects resulting from the loading saturate, and the porous support diminishes the surface area. Hence, it is unpreferable to load the first ingredient and the second ingredient in such loading amounts deviating from the range.

In a sixth aspect of the present invention, a catalyst according to the present invention comprises, in addition to the above-described catalyst ingredients, at least two ingredients loaded thereon. The two ingredients are selected from the group consisting of alkaline-earth metals, and they can preferably be Mg, Ca, Ba and Sr. The loading amount of each of the two ingredients (or the two alkaline-earth metal ingredients) can preferably fall in a range of from 0.05 to 1.0 mole/liter, and the loading amounts of the two ingredients can preferably fall in a range of from 0.1 to 2.0 moles/liter in total. When the ingredients are loaded in an amount of less than the lower limit, the durability of the $NO_x$ purifying performance deteriorates at elevated temperatures. When the ingredients are loaded in an amount more than the upper limit, the advantageous effects resulting from the loading saturate, and the porous support diminishes the surface area. Hence, it is unpreferable to load the ingredients in such loading amounts deviating from the range.

In a seventh aspect of the present invention, a catalyst according to the present invention comprises, in addition to the above-described catalyst ingredients, at least one first ingredient loaded thereon, and at least one second ingredient loaded thereon. The first ingredient is selected from the group consisting of alkaline-earth metals, and it can preferably be Mg, Ca, Ba and Sr. The second ingredient is selected from the group consisting of rare-earth elements including La, and it can preferably be one of lanthanides such as La, Pr, Nd and Sm. The loading amount of the first ingredient (or the alkaline-earth metal ingredient) can preferably fall in a range of from 0.05 to 1.0 mole/liter. The loading amount of the second ingredient (or the rare-earth element ingredient) can preferably fall in a range of from 0.05 to 1.0 mole/liter. The loading amount of the first ingredient and the loading amount of the second ingredient can preferably fall in a range of from 0.1 to 2.0 moles/liter in total. When the first ingredient and the second ingredient are loaded in an amount of less than the lower limit, the durability of the $NO_x$ purifying performance deteriorates at elevated temperatures. When the first ingredient and the second ingredient are loaded in an amount more than the upper limit, the advantageous effects resulting from the loading saturate, and the porous support diminishes the surface area. Hence, it is unpreferable to load the first ingredient and the second ingredient in such loading amounts deviating from the range.

In an eighth aspect of the present invention, a catalyst according to the present invention comprises, in addition to the above-described catalyst ingredients, a plurality of ingredients compositely loaded thereon. The ingredients are Ba, Li, La, Ce and Zr. These five ingredients can be compounded in any composition unlimitedly. However, when the porous support is formed of alumina, it is preferred that Ba is compounded in an amount of from 8 to 45 mole % to 100 mole % of alumina, Li is compounded in an amount of from 4 to 18 mole % thereto, La is compounded in an amount of from 4 to 12 mole % thereto, Ce is compounded in an amount of from 17 to 45 mole % thereto, and Zr is compounded in an amount of from 4 to 9 mole % thereto.

As to a material for constituting the porous support, it can, for example, be alumina, zeolite, zirconia, silica alumina, silica, or the like. These materials can be formed into the porous support, or they can be coated on a honeycomb support formed of cordierite, heat resistant metal, or the like.

In accordance with a process of the present invention for purifying exhaust gases, either one of the eight present catalysts is brought into contact with oxygen-rich exhaust gases, whose oxygen concentrations are the stoichiometric point or more required for oxidizing the components to be oxidized therein, thereby purifying the exhaust gases.

In the first aspect of the present invention, the present catalyst comprises at least two ingredients selected from the group consisting of rare-earth elements including La and loaded compositely on the porous support. The two ingredients retrieve $SO_2$ contained in the exhaust gases into the present catalyst in a form of composite sulfates.

In the second aspect of the present invention, the present catalyst comprises at least one first ingredient selected from the group consisting of rare-earth elements including La, and at least one second ingredient selected from the group consisting of Fe, Ni, Co and Mn. The first and second ingredients are loaded compositely on the porous support, and they retrieve $SO_2$ contained in the exhaust gases into the present catalyst in a form of composite sulfates.

In the third aspect of the present invention, the present catalyst comprises at least two ingredients selected form the group consisting of alkali metals and loaded compositely on the porous support. The two ingredients retrieve $SO_2$ contained in the exhaust gases into the present catalyst in a form of composite sulfates.

In the fourth aspect of the present invention, the present catalyst comprises at least one first ingredient selected from the group consisting of alkali metals, and at least one second ingredient selected from the group consisting of rare-earth elements including La. The first and second ingredients are loaded compositely on the porous support, and they retrieve $SO_2$ contained in the exhaust gases into the present catalyst in a form of composite sulfates.

In the fifth aspect of the present invention, the present catalyst comprises at least one first ingredient selected from the group consisting of alkali metals, and at least one second ingredient selected from the group consisting of Fe, Ni, Co, and Mn. The first and second ingredients are loaded compositely on the porous support, and they retrieve $SO_2$ contained in the exhaust gases into the present catalyst in a form of composite sulfates.

In the sixth aspect of the present invention, the present catalyst comprises at least two ingredients selected form the group consisting of alkaline-earth metals and loaded compositely on the porous support. The two ingredients retrieve $SO_2$ contained in the exhaust gases into the present catalyst in a form of composite sulfates.

In the seventh aspect of the present invention, the present catalyst comprises at least one first ingredient selected from the group consisting of alkaline-earth metals, and at least one second ingredient selected from the group consisting of rare-earth elements including La. The first and second ingredients are loaded compositely on the porous support, and they retrieve $SO_2$ contained in the exhaust gases into the present catalyst in a form of composite sulfates.

In the eighth aspect of the present invention, the present catalyst comprises the five ingredients, e.g., Ba, Li, La, Ce and Zr, and loaded compositely on the porous support. The five ingredients retrieve $SO_2$ contained in the exhaust gases into the present catalyst in a form of composite sulfates.

In the process for purifying exhaust gases according to the present invention, either one of the eight present catalysts is brought into contact with the oxygen-rich exhaust gases. Hence, $SO_2$ contained in the exhaust gases is retrieved by the action of the ingredients into the present catalysts in a form of composite sulfates.

The resulting composite sulfates are more likely to decompose at low temperatures in the atmospheres ranging from the stoichiometric atmosphere to the fuel-rich atmospheres (i.e., in the oxygen-lean atmospheres) than the simple sulfates resulting from the independent ingredients. As a result, the rare-earth element ingredients including La, the alkali metal ingredients and the alkaline-earth metal ingredients can reproduce their $NO_x$ storage abilities because the composite sulfates are likely to decompose and release $SO_2$.

Thus, in the fuel-lean atmospheres (i.e., in the oxygen-rich atmospheres), $NO_x$ is adsorbed on the present catalyst for purifying exhaust gases. Then, in atmospheres ranging from the stoichiometric atmosphere to the fuel-rich atmospheres (i.e., in the oxygen-lean atmospheres), $NO_x$ is reacted with CO and HC contained in the exhaust gases, and it is reduced to $N_2$. Namely, in the atmospheres ranging from stoichiometric atmosphere to the fuel-rich atmospheres (i.e., in the oxygen-lean atmospheres), $NO_x$ is reduced and purified, and at the same time CO and HC are oxidized and purified as well.

With the above-described mechanism, it is believed that the present catalyst for purifying exhaust gases can maintain the $NO_x$ adsorbing ability for a long period of time, and accordingly it can keep the catalyst activity high. In addition, when at least two of the rare-earth element ingredients, the alkali metal ingredients and the alkaline-earth metal ingredients are loaded compositely, they come to have smaller particle diameters, and they hardly grow to the crystalline sulfates because the composite sulfates are likely to decompose and release $SO_2$. As a result, they can be kept to be highly dispersed for a long period of time, they can produce large surface areas capable of contacting $NO_x$, and they can be disposed close to Pt and/or Pd so as to facilitate the catalyst reaction. Hence, the composite loading is believed to be one of the reasons why the present catalyst can keep the high catalyst activity even after it is subjected to a harsh durability test.

In particular, in the eighth aspect of the present invention, it is still under investigation how the five ingredients operate compositely or cooperatively so as to improve the durability of the present catalyst. However, the durability is believed to be enhanced, because Ba is a major component adsorbing $NO_x$ and $SO_2$, and because the other four ingredients, e.g., Li, La, Ce and Zr, enable to readily decompose the composite sulfates resulting from the compounding of Ba and $SO_2$ or they act on the porous support, for instance, on the porous support formed of alumina, so as to prevent alumina from reacting with Ba.

As having been described so far, in accordance with the present catalyst for purifying exhaust gases or the present process therefor, superb $NO_x$ purifying performance can be maintained even after a durability test is carried out, and $NO_x$ can be purified efficiently even in the atmospheres on the fuel-lean side where the exhaust gases contain oxygen in excessive amounts.

DETAILED DESCRIPTION OF THE PREFERRED EMBODIMENTS

Having generally described the present invention, a further understanding can be obtained by reference to the specific preferred embodiments which are provided herein for purposes of illustration only and are not intended to limit the scope of the appended claims. Unless otherwise specified, a term, "parts," hereinafter means "parts by weight."

FIRST PREFERRED EMBODIMENTS 100 parts of an alumina powder, 70 parts of alumina sol containing alumina in an amount of 10% by weight, 15 parts of an aqueous aluminum nitrate solution containing aluminum nitrate in an amount of 40% by weight, and 30 parts of water were mixed, thereby preparing a slurry for coating.

Then, a plurality of honeycomb supports formed of cordierite were immersed into the slurry, and thereafter each of them was blown to blow away the slurry in excess. After drying, each of the supports was burned at 600° C. for 1 hour, thereby forming an alumina coating layer thereon. The alumina coating layer was thus coated on the support in an amount of 120 grams with respect to 1 liter of the support.

Each of the honeycomb supports with the alumina coating layer formed thereon was immersed into an aqueous platinum dinitrodiammine solution or an aqueous palladium nitrate solution, and thereafter it was blown to blow away the water droplets in excess. After the blowing, each of the supports was dried at 250° C. for 3 hours, thereby loading Pt or Pd thereon. The loading amounts of Pt or Pd are set forth in Table 1 below.

Finally, each of the honeycomb supports with Pt or Pd loaded was immersed into a mixed aqueous solution which contains nitrates of rare-earth elements including La in predetermined concentrations. The term, "rare-earth elements," hereinafter means "rare-earth elements including La." The rare-earth elements employed were La, Pr, Nd and Sm. Each of the mixed aqueous solutions was prepared by mixing the nitrates of rare-earth elements with water so as to load the rare-earth element ingredients in loading amounts set forth in Table 1 below. Each of the supports was then blown to blow away the water droplets in excess. After drying, each of the supports was burned at 600° C. for 1 hour, thereby completing each of the present catalysts designated at No. 1 through No. 9 in Table 1.

SECOND PREFERRED EMBODIMENTS

A plurality of honeycomb supports with Pt loaded were prepared in the same manner as described in the "First Preferred Embodiments" section. Then, each of the supports was immersed into a mixed aqueous solution which contains not only a nitrate of rare-earth elements but also a nitrate of transition elements in predetermined concentrations. Each of the mixed aqueous solutions was prepared by mixing the nitrate of rare-earth elements and the nitrate of transition elements with water so as to load the rare-earth element ingredient and the transition element ingredient in loading amounts set forth in Table 1 below. The transition elements employed were Fe, Ni, Co and Mn. Each of the supports was then blown to blow away the water droplets in excess. After drying, each of the supports was burned at 600° C. for 1 hour, thereby completing each of the present catalysts designated at No. 10 through No. 21 in Table 1.

FIRST COMPARATIVE EXAMPLES

First Comparative Examples, e.g., comparative catalysts designated at No. 22 through No. 29 in Table 1 below, were prepared in the same manner as described in the "First Preferred Embodiments" section except that each of the honeycomb supports with Pt or Pd loaded was immersed into an aqueous solution which contains one and only nitrate of rare-earth elements, thereby loading one and only rare-earth element ingredient thereon.

TABLE 1

| | | Loading Amount, Catalyst Ingredient (gram/liter) | | Loading Amount, Rare-earth Element Ingredient (mole/liter) | | | | Loading Amount, Transition Element Ingredient (mole/liter) | | | | Initial Conversion (%) | | | Conversion after Durability Test (%) | | |
|---|---|---|---|---|---|---|---|---|---|---|---|---|---|---|---|---|---|
| | | Pt | Pd | La | Pr | Nd | Sm | Fe | Ni | Co | Mn | NOx | HC | CO | NOx | HC | CO |
| 1st Pref. Embodiments | No. 1 | 2.0 | — | 0.15 | 0.15 | — | — | — | — | — | — | 92 | 98 | 100 | 52 | 98 | 100 |
| | No. 2 | 2.0 | — | 0.15 | — | 0.15 | — | — | — | — | — | 93 | 98 | 100 | 55 | 97 | 99 |
| | No. 3 | 2.0 | — | 0.15 | — | — | 0.15 | — | — | — | — | 92 | 98 | 100 | 53 | 98 | 100 |
| | No. 4 | 2.0 | — | — | 0.15 | 0.15 | — | — | — | — | — | 90 | 98 | 100 | 50 | 97 | 99 |
| | No. 5 | 2.0 | — | — | 0.15 | — | 0.15 | — | — | — | — | 90 | 97 | 100 | 53 | 98 | 100 |
| | No. 6 | 2.0 | — | — | — | 0.15 | 0.15 | — | — | — | — | 91 | 98 | 100 | 53 | 98 | 100 |
| | No. 7 | — | 3.0 | 0.15 | 0.15 | — | — | — | — | — | — | 92 | 98 | 100 | 48 | 96 | 100 |
| | No. 8 | — | 3.0 | 0.15 | — | 0.15 | — | — | — | — | — | 93 | 98 | 100 | 45 | 95 | 99 |
| | No. 9 | — | 3.0 | 0.15 | — | — | 0.15 | — | — | — | — | 92 | 93 | 100 | 44 | 95 | 100 |
| 2nd Pref. Embodiments | No. 10 | 2.0 | — | 0.30 | — | — | — | 0.10 | — | — | — | 90 | 98 | 100 | 54 | 97 | 99 |
| | No. 11 | 2.0 | — | 0.30 | — | — | — | — | 0.10 | — | — | 90 | 97 | 100 | 53 | 97 | 99 |
| | No. 12 | 2.0 | — | 0.30 | — | — | — | — | — | 0.10 | — | 89 | 99 | 100 | 50 | 96 | 100 |
| | No. 13 | 2.0 | — | 0.30 | — | — | — | — | — | — | 0.10 | 88 | 97 | 100 | 51 | 96 | 99 |
| | No. 14 | 2.0 | — | — | 0.30 | — | — | 0.10 | — | — | — | 89 | 97 | 100 | 49 | 95 | 99 |
| | No. 15 | 2.0 | — | — | — | 0.30 | — | 0.10 | — | — | — | 88 | 98 | 100 | 50 | 96 | 99 |
| | No. 16 | 2.0 | — | — | — | 0.30 | — | — | 0.10 | — | — | 86 | 95 | 100 | 51 | 95 | 99 |
| | No. 17 | 2.0 | — | — | — | 0.30 | — | — | 0.10 | — | — | 86 | 96 | 100 | 48 | 96 | 100 |
| | No. 18 | 2.0 | — | — | — | 0.30 | — | — | — | 0.10 | — | 87 | 98 | 100 | 48 | 95 | 100 |

TABLE 1-continued

|  |  | Loading Amount, Catalyst Ingredient (gram/liter) | | Loading Amount, Rare-earth Element Ingredient (mole/liter) | | | | Loading Amount, Transition Element Ingredient (mole/liter) | | | | Initial Conversion (%) | | | Conversion after Durability Test (%) | | |
|---|---|---|---|---|---|---|---|---|---|---|---|---|---|---|---|---|---|
|  |  | Pt | Pd | La | Pr | Nd | Sm | Fe | Ni | Co | Mn | NOx | HC | CO | NOx | HC | CO |
| | No. 19 | 2.0 | — | — | — | 0.30 | — | — | — | — | 0.10 | 88 | 97 | 100 | 50 | 96 | 100 |
| | No. 20 | 2.0 | — | — | — | — | 0.30 | 0.10 | — | — | — | 85 | 97 | 100 | 38 | 95 | 99 |
| | No. 21 | 2.0 | — | — | — | — | 0.30 | — | 0.10 | — | — | 86 | 97 | 100 | 34 | 95 | 99 |
| 1st | No. 22 | 2.0 | — | 0.30 | — | — | — | — | — | — | — | 91 | 97 | 100 | 34 | 98 | 100 |
| Oomp. | No. 23 | 2.0 | — | — | 0.30 | — | — | — | — | — | — | 89 | 99 | 100 | 32 | 98 | 99 |
| Ex. | No. 24 | 2.0 | — | — | — | 0.30 | — | — | — | — | — | 88 | 98 | 100 | 30 | 97 | 100 |
| | No. 25 | 2.0 | — | — | — | — | 0.30 | — | — | — | — | 88 | 98 | 100 | 30 | 98 | 99 |
| | No. 26 | — | 3.0 | 0.30 | — | — | — | — | — | — | — | 69 | 97 | 100 | 44 | 95 | 99 |
| | No. 27 | — | 3.0 | — | 0.30 | — | — | — | — | — | — | 67 | 97 | 100 | 28 | 93 | 100 |
| | No. 28 | — | 3.0 | — | — | 0.30 | — | — | — | — | — | 65 | 99 | 100 | 26 | 94 | 100 |
| | No. 29 | — | 3.0 | — | — | — | 0.30 | — | — | — | — | 65 | 97 | 100 | 26 | 93 | 100 |

Examination for Purifying Performance

Each of the present catalysts and the comparative catalysts was disposed in an exhaust line of an actual vehicle equipped with a lean burn engine. The lean burn engine had a displacement of 1.6 liters. The vehicle was driven in the urban area running mode, for instance, it was alternately driven in the 10-mode for a certain period of time and then in the 15-mode for another certain period of time, thereby examining the present and comparative catalysts for the conversion of CO, HC and $NO_x$. The results of the evaluation were summarized in the columns designated at "Initial Conversion" in Table 1.

After the aforementioned evaluation, each of the present catalysts and the comparative catalysts was subjected to a bench test on durability which utilized the same type of engine as above. Namely, each of them was disposed in an exhaust line of the engine, and then the engine was run for 100 hours while adjusting the temperature of the exhaust gas introduced into them at 650° C. After this bench test was over, each of them was again disposed in the exhaust line of the actual vehicle. The vehicle was driven in the same manner as described above, thereby examining the present and comparative catalysts for the conversion of CO, HC and $NO_x$. The results of the evaluation were summarized in the columns designated at "Conversion after Durability Test" in Table 1.

Evaluation

It is appreciated from Table 1 that the present catalysts with two rare-earth element ingredients loaded, the present catalysts with a rare-earth element ingredient and a transition element ingredient loaded were improved in terms of the $NO_x$ conversion after the durability test over the comparative catalysts with one and only rare-earth element ingredient loaded.

THIRD PREFERRED EMBODIMENTS

A plurality of honeycomb supports were prepared by coating them with the alumina coating layer in the same manner as described in the "First Preferred Embodiments" section.

Each of the honeycomb supports with the alumina coating layer formed thereon was immersed into an aqueous platinum dinitrodiammine solution or an aqueous palladium nitrate solution, and thereafter it was blown to blow away the water droplets in excess. After the blowing, each of the supports was dried at 250° C., for 3 hours thereby loading Pt or Pd thereon. The loading amounts of Pt or Pd are set forth in Table 2 below.

Then, each of the supports with Pt or Pd loaded was immersed into a mixed aqueous solution which contains nitrates of alkali metals in predetermined concentrations. Each of the mixed aqueous solutions was prepared by mixing the nitrates of alkali metals with water so as to load the alkali metal ingredients in loading amounts set forth in Table 2 below. The alkali metals employed were Li, Na, K, Rb and Cs. Each of the supports was then blown to blow away the water droplets in excess. After drying, each of the supports was burned at 600° C. for 1 hour, thereby completing each of the present catalysts designated at No. 30 through No. 41 in Table 2.

FOURTH PREFERRED EMBODIMENTS

A plurality of honeycomb supports with Pt loaded were prepared in the same manner as described in the "First Preferred Embodiments" section. Then, each of the supports was immersed into a mixed aqueous solution which contains not only a nitrate of alkali metals but also a nitrate of rare-earth elements in predetermined concentrations. Each of the mixed aqueous solutions was prepared by mixing the nitrate of alkali metals and the nitrate of rare-earth elements with water so as to load the alkali metal ingredient and the rare-earth element ingredient in loading amounts set forth in Table 3 below. Each of the supports was then blown to blow away the water droplets in excess. After drying, each of the supports was burned at 600° C. for 1 hour, thereby completing each of the present catalysts designated at No. 51 through No. 64 in Table 3.

FIFTH PREFERRED EMBODIMENTS

A plurality of honeycomb supports with Pt loaded were prepared in the same manner as described in the "First Preferred Embodiments" section. Then, each of the supports was immersed into a mixed aqueous solution which contains not only a nitrate of alkali metals but also a nitrate of transition elements in predetermined concentrations. Each of the mixed aqueous solutions was prepared by mixing the nitrate of alkali metals and the nitrate of transition elements with water so as to load the alkali metal ingredient and the transition element ingredient in loading amounts set forth in Table 4 below. Each of the supports was then blown to blow away the water droplets in excess. After drying, each of the supports was burned at 600° C. for 1 hour, thereby completing each of the present catalysts designated at No. 65 through No. 76 in Table 4.

TABLE 2

| | | Loading Amount, Catalyst Ingredient (gram/liter) | | Loading Amount, Alkali Metal Ingredient (mole/liter) | | | | | Initial Conversion (%) | | | Conversion after Durability Test (%) | | |
|---|---|---|---|---|---|---|---|---|---|---|---|---|---|---|
| | | Pt | Pd | Li | Na | K | Rb | Cs | NOx | HC | CO | NOx | HC | CO |
| 3rd Pref. Embodi- ments | No. 30 | 2.0 | — | 0.10 | 0.30 | — | — | — | 89 | 94 | 100 | 55 | 91 | 99 |
| | No. 31 | 2.0 | — | 0.10 | — | 0.30 | — | — | 91 | 92 | 100 | 58 | 92 | 100 |
| | No. 32 | 2.0 | — | 0.10 | — | — | 0.30 | — | 75 | 92 | 100 | 50 | 91 | 99 |
| | No. 33 | 2.0 | — | 0.10 | — | — | — | 0.30 | 77 | 90 | 100 | 48 | 92 | 100 |
| | No. 34 | 2.0 | — | — | 0.10 | 0.30 | — | — | 93 | 95 | 100 | 55 | 91 | 99 |
| | No. 35 | 2.0 | — | — | 0.30 | 0.10 | — | — | 92 | 96 | 100 | 53 | 93 | 99 |
| | No. 36 | 2.0 | — | — | — | 0.30 | — | 0.10 | 90 | 92 | 100 | 50 | 92 | 99 |
| | No. 37 | 2.0 | — | — | 0.30 | — | — | 0.10 | 91 | 91 | 100 | 49 | 93 | 100 |
| | No. 38 | 2.0 | — | 0.30 | — | 0.10 | — | — | 92 | 92 | 100 | 50 | 93 | 99 |
| | No. 39 | — | 3.0 | 0.30 | 0.10 | — | — | — | 68 | 97 | 100 | 42 | 93 | 98 |
| | No. 40 | — | 3.0 | — | 0.30 | 0.10 | — | — | 77 | 95 | 100 | 46 | 94 | 98 |
| | No. 41 | — | 3.0 | — | — | 0.30 | 0.10 | — | 79 | 96 | 100 | 46 | 94 | 97 |
| 2nd Comp. Ex. | No. 42 | 2.0 | — | 0.10 | — | — | — | — | 63 | 98 | 100 | 30 | 95 | 99 |
| | No. 43 | 2.0 | — | 0.30 | — | — | — | — | 72 | 97 | 100 | 34 | 94 | 99 |
| | No. 44 | 2.0 | — | — | 0.30 | — | — | — | 88 | 94 | 100 | 37 | 92 | 100 |
| | No. 45 | 2.0 | — | — | — | 0.30 | — | — | 88 | 93 | 100 | 38 | 93 | 99 |
| | No. 46 | 2.0 | — | — | — | — | 0.30 | — | 70 | 90 | 100 | 31 | 90 | 100 |
| | No. 47 | 2.0 | — | — | — | — | — | 0.30 | 70 | 90 | 100 | 30 | 91 | 100 |
| | No. 48 | — | 3.0 | 0.30 | — | — | — | — | 64 | 93 | 99 | 27 | 90 | 99 |
| | No. 49 | — | 3.0 | — | 0.30 | — | — | — | 73 | 94 | 98 | 30 | 88 | 98 |
| | No. 50 | — | 3.0 | — | — | 0.30 | — | — | 74 | 95 | 98 | 32 | 88 | 97 |

TABLE 3

| | | Loading Amount, Catalyst Ingredient (gram/liter) | | Loading Amount, Alkali Metal Ingredient (mole/liter) | | | | | Loading Amount, Hare-earth Element Ingredient (mole/liter) | | | | Initial Conversion (%) | | | Conversion after Durability Test (%) | | |
|---|---|---|---|---|---|---|---|---|---|---|---|---|---|---|---|---|---|---|
| | | Pt | Pd | Li | Na | K | Rb | Cs | La | Pr | Nd | Sm | NOx | HC | CO | NOx | HC | CO |
| 4th Pref. Embodi- ments | No. 51 | 2.0 | — | 0.30 | — | — | — | — | 0.10 | — | — | — | 85 | 95 | 100 | 47 | 97 | 99 |
| | No. 52 | 2.0 | — | 0.10 | — | — | — | — | 0.30 | — | — | — | 90 | 95 | 100 | 54 | 98 | 100 |
| | No. 53 | 2.0 | — | 0.30 | — | — | — | — | — | — | 0.10 | — | 83 | 93 | 100 | 47 | 96 | 99 |
| | No. 54 | 2.0 | — | 0.10 | — | — | — | — | — | — | 0.30 | — | 91 | 96 | 100 | 57 | 96 | 100 |
| | No. 55 | 2.0 | — | — | 0.30 | — | — | — | 0.10 | — | — | — | 88 | 92 | 100 | 56 | 96 | 100 |
| | No. 56 | 2.0 | — | — | 0.30 | — | — | — | — | 0.10 | — | — | 87 | 93 | 100 | 53 | 94 | 100 |
| | No. 57 | 2.0 | — | — | 0.30 | — | — | — | — | — | 0.10 | — | 90 | 94 | 100 | 54 | 96 | 100 |
| | No. 58 | 2.0 | — | — | 0.30 | — | — | — | — | — | — | 0.10 | 91 | 92 | 100 | 53 | 95 | 100 |
| | No. 59 | 2.0 | — | — | — | 0.30 | — | — | 0.10 | — | — | — | 92 | 90 | 100 | 58 | 94 | 99 |
| | No. 60 | 2.0 | — | — | — | 0.30 | — | — | — | 0.10 | — | — | 91 | 94 | 100 | 59 | 96 | 99 |
| | No. 61 | 2.0 | — | — | — | 0.30 | — | — | — | — | 0.10 | — | 92 | 91 | 100 | 57 | 95 | 99 |
| | No. 62 | 2.0 | — | — | — | 0.30 | — | — | — | — | — | 0.10 | 90 | 92 | 100 | 56 | 95 | 99 |
| | No. 63 | 2.0 | — | — | — | — | — | 0.30 | 0.10 | — | — | — | 90 | 93 | 100 | 51 | 96 | 98 |
| | No. 64 | 2.0 | — | — | — | — | — | 0.30 | — | — | 0.10 | — | 90 | 94 | 100 | 51 | 95 | 98 |
| 2nd Comp. Ex. | No. 42 | 2.0 | — | 0.10 | — | — | — | — | — | — | — | — | 63 | 98 | 100 | 30 | 95 | 99 |
| | No. 43 | 2.0 | — | 0.30 | — | — | — | — | — | — | — | — | 72 | 97 | 100 | 34 | 94 | 99 |
| | No. 44 | 2.0 | — | — | 0.30 | — | — | — | — | — | — | — | 88 | 94 | 100 | 37 | 92 | 100 |
| | No. 45 | 2.0 | — | — | — | 0.30 | — | — | — | — | — | — | 88 | 93 | 100 | 38 | 93 | 99 |
| | No. 46 | 2.0 | — | — | — | — | 0.30 | — | — | — | — | — | 70 | 90 | 100 | 31 | 90 | 100 |
| | No. 47 | 2.0 | — | — | — | — | — | 0.30 | — | — | — | — | 70 | 90 | 100 | 30 | 91 | 100 |
| | No. 48 | — | 3.0 | 0.30 | — | — | — | — | — | — | — | — | 64 | 93 | 99 | 27 | 90 | 99 |
| | No. 49 | — | 3.0 | — | 0.30 | — | — | — | — | — | — | — | 73 | 94 | 98 | 30 | 88 | 98 |
| | No. 50 | — | 3.0 | — | — | 0.30 | — | — | — | — | — | — | 74 | 95 | 98 | 32 | 88 | 97 |

TABLE 4

| | | Loading Amount, Catalyst Ingredient (gram/liter) | | Loading Amount, Alkali Metal Ingredient (mole/liter) | | | | | Loading Amount, Hare-earth Element Ingredient (mole/liter) | | | | Initial Conversion (%) | | | Conversion after Durability Test (%) | | |
|---|---|---|---|---|---|---|---|---|---|---|---|---|---|---|---|---|---|---|
| | | Pt | Pd | Li | Na | K | Rb | Cs | Fe | Ni | Co | Mn | NOx | HC | CO | NOx | HC | CO |
| 5th Pref. Embodi- ments | No. 65 | 2.0 | — | 0.30 | — | — | — | — | 0.10 | — | — | — | 72 | 96 | 100 | 45 | 95 | 99 |
| | No. 66 | 2.0 | — | 0.30 | — | — | — | — | — | 0.10 | — | — | 70 | 97 | 100 | 47 | 98 | 100 |
| | No. 67 | 2.0 | — | — | 0.30 | — | — | — | 0.10 | — | — | — | 86 | 97 | 100 | 51 | 96 | 99 |
| | No. 68 | 2.0 | — | — | 0.30 | — | — | — | — | 0.10 | — | — | 87 | 98 | 100 | 53 | 96 | 100 |
| | No. 69 | 2.0 | — | — | 0.30 | — | — | — | — | — | 0.10 | — | 85 | 96 | 100 | 52 | 97 | 100 |
| | No. 70 | 2.0 | — | — | 0.30 | — | — | — | — | — | — | 0.10 | 87 | 96 | 100 | 53 | 96 | 100 |

TABLE 4-continued

| | | Loading Amount, Catalyst Ingredient (gram/liter) | | Loading Amount, Alkali Metal Ingredient (mole/liter) | | | | | Loading Amount, Hare-earth Element Ingredient (mole/liter) | | | | Initial Conversion (%) | | | Conversion after Durability Test (%) | | |
|---|---|---|---|---|---|---|---|---|---|---|---|---|---|---|---|---|---|---|
| | | Pt | Pd | Li | Na | K | Rb | Cs | Fe | Ni | Co | Mn | NOx | HC | CO | NOx | HC | CO |
| | No. 71 | 2.0 | — | — | — | 0.30 | — | — | 0.10 | — | — | — | 87 | 99 | 100 | 52 | 96 | 100 |
| | No. 72 | 2.0 | — | — | — | 0.30 | — | — | — | 0.10 | — | — | 89 | 99 | 100 | 56 | 95 | 100 |
| | No. 73 | 2.0 | — | — | — | 0.30 | — | — | — | — | 0.10 | — | 89 | 98 | 100 | 57 | 94 | 99 |
| | No. 74 | 2.0 | — | — | — | 0.30 | — | — | — | — | — | 0.10 | 88 | 98 | 100 | 57 | 96 | 99 |
| | No. 75 | 2.0 | — | — | — | — | — | 0.30 | 0.10 | — | — | — | 73 | 97 | 100 | 49 | 98 | 99 |
| | No. 76 | 2.0 | — | — | — | — | — | 0.30 | — | 0.10 | — | — | 75 | 97 | 100 | 48 | 95 | 99 |
| 2nd | No. 42 | 2.0 | — | 0.10 | — | — | — | — | — | — | — | — | 63 | 98 | 100 | 30 | 95 | 99 |
| Comp. | No. 43 | 2.0 | — | 0.30 | — | — | — | — | — | — | — | — | 72 | 97 | 100 | 34 | 94 | 99 |
| Ex. | No. 44 | 2.0 | — | — | 0.30 | — | — | — | — | — | — | — | 88 | 94 | 100 | 37 | 92 | 100 |
| | No. 45 | 2.0 | — | — | — | 0.30 | — | — | — | — | — | — | 88 | 93 | 100 | 38 | 93 | 99 |
| | No. 46 | 2.0 | — | — | — | — | 0.30 | — | — | — | — | — | 70 | 90 | 100 | 31 | 90 | 100 |
| | No. 47 | 2.0 | — | — | — | — | — | 0.30 | — | — | — | — | 70 | 90 | 100 | 30 | 91 | 100 |
| | No. 48 | — | 3.0 | 0.30 | — | — | — | — | — | — | — | — | 64 | 93 | 99 | 27 | 90 | 99 |
| | No. 49 | — | 3.0 | — | 0.30 | — | — | — | — | — | — | — | 73 | 94 | 98 | 30 | 88 | 98 |
| | No. 50 | — | 3.0 | — | — | 0.30 | — | — | — | — | — | — | 74 | 95 | 98 | 32 | 88 | 97 |

SECOND COMPARATIVE EXAMPLES

Second Comparative Examples, e.g., comparative catalysts designated at No. 42 through No. 50 in Tables 2, 3 and 4, were prepared in the same manner as described in the "Third, Fourth and Fifth Preferred Embodiments" sections except that each of the honeycomb supports with Pt or Pd loaded was immersed into an aqueous solution which contains one and only nitrate of alkali metals, thereby loading one and only alkali metal ingredient thereon.

Examination for Purifying Performance

Each of the present catalysts and the comparative catalysts was disposed in an exhaust line of an actual vehicle equipped with a lean burn engine. The lean burn engine had a displacement of 1.6 liters. The vehicle was driven in the urban area running mode, for instance, it was alternately driven in the 10-mode for a certain period of time and then in the 15-mode for another certain period of time, thereby examining the present and comparative catalysts for the conversion of CO, HC and $NO_x$. The results of the evaluation were summarized in the columns designated at "Initial Conversion" in Tables 2, 3 and 4.

After the aforementioned evaluation, each of the present catalysts and the comparative catalysts was subjected to a bench test on durability which utilized the same type of engine as above. Namely, each of them was disposed in an exhaust line of the engine, and then the engine was run for 100 hours while adjusting the temperature of the exhaust gas introduced into them at 650° C. After this bench test was over, each of them was again disposed in the exhaust line of the actual vehicle. The vehicle was driven in the same manner as described above, thereby examining the present and comparative catalysts for the conversion of CO, HC and $NO_x$. The results of the evaluation were summarized in the columns designated at "Conversion after Durability Test" in Tables 2, 3 and 4.

Evaluation

It is appreciated from Tables 2, 3 and 4 that the present catalysts with two alkali metal ingredients loaded, the present catalysts with an alkali metal ingredient and a rare-earth element ingredient loaded, and the present catalyst with an alkali metal ingredient and a transition element ingredient loaded were improved in terms of the $NO_x$ conversion after the durability test over the comparative catalysts with one and only alkali metal ingredient loaded.

SIXTH PREFERRED EMBODIMENTS

A plurality of honeycomb supports were prepared by coating them with the alumina coating layer in the same manner as described in the "First Preferred Embodiments" section.

Each of the honeycomb supports with the alumina coating layer formed thereon was immersed into an aqueous platinum dinitrodiammine solution and/or an aqueous palladium nitrate solution, and thereafter it was blown to blow away the water droplets in excess. After the blowing, each of the supports was dried at 250° C., for 3 hours thereby loading Pt and/or Pd thereon. The loading amounts of Pt and/or Pd are set forth in Table 5 below.

Then, each of the supports with Pt and/or Pd loaded was immersed into a mixed aqueous solution which contains two nitrates of alkaline-earth metals in predetermined concentrations. Each of the mixed aqueous solutions was prepared by mixing the two nitrates of alkali metals with water so as to load the two alkaline-earth metals in loading amounts set forth in Table 5 below. The alkaline-earth metals employed were Ba, Mg, Ca and Sr, and they are combined and loaded. Each of the supports was then blown to blow away the water droplets in excess. After drying, each of the supports was burned at 600° C. for 1 hour, thereby completing each of the present catalysts designated at No. 77 through No. 90 in Table 5.

TABLE 5

|  |  | Loading Amount, Catalyst Ingredient (gram/liter) | | Loading Amount, Alkaline-earth Metal Ingredient (mole/liter) | | | | Initial Conversion (%) | | | Conversion after Durability Test (%) | | |
|---|---|---|---|---|---|---|---|---|---|---|---|---|---|
|  |  | Pt | Pd | Ba | Ng | Ca | Sr | NOx | HC | CO | NOx | HC | CO |
| 6th | No. 77 | 2.0 | — | 0.3 | 0.1 | — | — | 92 | 98 | 100 | 66 | 94 | 99 |
| Pref. | No. 78 | 2.0 | — | 0.3 | 0.2 | — | — | 93 | 98 | 100 | 65 | 93 | 100 |
| Embodi- | No. 79 | 2.0 | — | 0.5 | 0.2 | — | — | 92 | 98 | 100 | 66 | 93 | 99 |
| ments | No. 80 | 2.0 | — | 0.3 | — | 0.1 | — | 93 | 94 | 100 | 54 | 88 | 100 |
|  | No. 81 | 2.0 | — | 0.5 | — | 0.2 | — | 92 | 93 | 100 | 55 | 89 | 99 |
|  | No. 82 | 2.0 | — | 0.3 | — | — | 0.1 | 92 | 96 | 100 | 58 | 92 | 99 |
|  | No. 83 | 2.0 | — | 0.3 | — | — | 0.2 | 93 | 95 | 100 | 57 | 90 | 100 |
|  | No. 84 | 2.0 | — | 0.5 | — | — | 0.2 | 92 | 96 | 100 | 59 | 91 | 99 |
|  | No. 85 | 2.0 | — | — | 0.1 | — | 0.3 | 93 | 95 | 100 | 57 | 90 | 100 |
|  | No. 86 | 2.0 | — | — | 0.2 | — | 0.5 | 92 | 96 | 100 | 59 | 91 | 99 |
|  | No. 87 | 1.0 | 2.0 | — | — | 0.1 | 0.3 | 85 | 95 | 100 | 51 | 90 | 100 |
|  | No. 88 | 1.0 | 2.0 | — | — | 0.2 | 0.5 | 87 | 94 | 100 | 52 | 91 | 99 |
|  | No. 89 | — | 3.0 | — | 0.1 | 0.3 | — | 78 | 95 | 100 | 49 | 92 | 100 |
|  | No. 90 | — | 3.0 | — | 0.2 | 0.5 | — | 80 | 94 | 100 | 50 | 93 | 99 |
| 3rd | No. 91 | 2.0 | — | 0.3 | — | — | — | 92 | 94 | 100 | 50 | 88 | 98 |
| Comp. | No. 92 | 2.0 | — | — | 0.3 | — | — | 69 | 97 | 100 | 38 | 91 | 98 |
| Ex. | No. 93 | — | 3.0 | — | — | 0.3 | — | 78 | 96 | 100 | 40 | 88 | 98 |
|  | No. 94 | 1.0 | 2.0 | — | — | — | 0.3 | 84 | 96 | 100 | 44 | 90 | 99 |

THIRD COMPARATIVE EXAMPLES

Third Comparative Examples, e.g., comparative catalysts designated at No. 91 through No. 94 in Table 5, were prepared in the same manner as described in the "Sixth Preferred Embodiments" section except that each of the honeycomb supports with Pt and/or Pd loaded was immersed into an aqueous solution which contains one and only nitrate of alkaline-earth metals, thereby loading one and only alkaline-earth metal ingredient thereon.

Examination for Purifying Performance

Each of the present catalysts and the comparative catalysts was disposed in an exhaust line of an actual vehicle equipped with a lean burn engine. The lean burn engine had a displacement of 1.6 liters. The vehicle was driven in the urban area running mode, for instance, it was alternately driven in the 10-mode for a certain period of time and then in the 15-mode for another certain period of time, thereby examining the present and comparative catalysts for the conversion of CO, HC and $NO_x$. The results of the evaluation were summarized in the columns designated at "Initial Conversion" in Table 5.

After the aforementioned evaluation, each of the present catalysts and the comparative catalysts was subjected to a bench test on durability which utilized the same type of engine as above. Namely, each of them was disposed in an exhaust line of the engine, and then the engine was run for 100 hours while adjusting the temperature of the exhaust gas introduced into them at 650° C. After this bench test was over, each of them was again disposed in the exhaust line of the actual vehicle. The vehicle was driven in the same manner as described above, thereby examining the present and comparative catalysts for the conversion of CO, HC and $NO_x$. The results of the evaluation were summarized in the columns designated at "Conversion after Durability Test" in Table 5.

Evaluation

It is appreciated from Table 5 that the present catalysts with two alkaline-earth metal ingredients loaded were improved in terms of the $NO_x$ conversion after the durability test over the comparative catalysts with one and only alkaline-earth metal ingredient loaded. Among the present catalyst, it is apparent that the present catalysts No. 77 through No. 79 on which the combination of Ba and Mg were loaded exhibited distinguished advantageous effects over the other present catalysts.

SEVENTH PREFERRED EMBODIMENTS

A plurality of honeycomb supports with Pt and/or Pd loaded were prepared in the same manner as described in the "First Preferred Embodiments" section. Then, each of the supports was immersed into a mixed aqueous solution which contains not only a nitrate of alkaline-earth metals but also a nitrate of rare-earth elements in predetermined concentrations. Each of the mixed aqueous solutions was prepared by mixing the nitrate of alkaline-earth metals and the nitrate of rare-earth elements with water so as to load the alkaline-earth metal ingredient and the rare-earth element ingredient in loading amounts set forth in Table 6 below. Each of the supports was then blown to blow away the water droplets in excess. After drying, each of the supports was burned at 600° C. for 1 hour, thereby completing each of the present catalysts designated at No. 95 through No. 111 in Table 6.

FOURTH COMPARETIVE EXAMPLES

Fourth Comparative Examples, e.g., comparative catalysts designated at No. 112 through No. 115 in Table 6 below, were prepared in the same manner as described in the "Seventh Preferred Embodiments" section except that each of the honeycomb supports with Pt or Pd loaded was immersed into an aqueous solution which contains one and only nitrate of alkaline-earth metals, thereby loading one and only alkaline-earth metal ingredient thereon.

TABLE 6

| | | Loading Amount, Catalyst Ingredient (gram/liter) | | Loading Amount, Alkaline-earth Metal Ingredient (mole/liter) | | | | Loading Amount, Rare-earth Element Ingredient (mole/liter) | | | | Initial Conversion (%) | | | Conversion after Durability Test (%) | | |
|---|---|---|---|---|---|---|---|---|---|---|---|---|---|---|---|---|---|
| | | Pt | Pd | Ba | Ca | Sr | Mg | La | Ce | Nd | Sm | NOx | HC | CO | NOx | HC | CO |
| 7th | No. 95 | 2.0 | — | 0.3 | — | — | — | 0.1 | — | — | — | 91 | 99 | 100 | 63 | 97 | 100 |
| Pref. | No. 96 | 2.0 | — | 0.3 | — | — | — | 0.3 | — | — | — | 89 | 99 | 100 | 65 | 99 | 100 |
| Embodi- | No. 97 | 2.0 | — | 0.3 | — | — | — | — | 0.1 | — | — | 88 | 98 | 100 | 62 | 96 | 99 |
| ments | No. 98 | 2.0 | — | 0.3 | — | — | — | — | — | 0.1 | — | 89 | 98 | 100 | 63 | 99 | 100 |
| | No. 99 | 2.0 | — | 0.3 | — | — | — | — | — | — | 0.1 | 87 | 98 | 100 | 61 | 97 | 100 |
| | No. 100 | 2.0 | — | — | 0.3 | — | — | 0.1 | — | — | — | 90 | 98 | 100 | 59 | 97 | 99 |
| | No. 101 | 2.0 | — | — | 0.3 | — | — | 0.3 | — | — | — | 90 | 98 | 100 | 60 | 95 | 100 |
| | No. 102 | 2.0 | — | — | 0.3 | — | — | — | 0.1 | — | — | 87 | 97 | 100 | 58 | 95 | 99 |
| | No. 103 | 2.0 | — | — | 0.3 | — | — | — | — | 0.1 | — | 88 | 96 | 100 | 57 | 96 | 100 |
| | No. 104 | 2.0 | — | — | 0.3 | — | — | — | — | — | 0.1 | 87 | 96 | 100 | 59 | 96 | 100 |
| | No. 105 | 2.0 | — | — | — | 0.3 | — | 0.1 | — | — | — | 90 | 99 | 100 | 59 | 97 | 100 |
| | No. 106 | 2.0 | — | — | — | 0.3 | — | 0.3 | — | — | — | 91 | 99 | 100 | 61 | 99 | 100 |
| | No. 107 | 2.0 | — | — | — | 0.3 | — | — | 0.1 | — | — | 92 | 98 | 100 | 59 | 96 | 100 |
| | No. 108 | 1.0 | 2.0 | — | — | 0.3 | — | — | — | 0.1 | — | 90 | 98 | 100 | 57 | 98 | 99 |
| | No. 109 | 1.0 | 2.0 | — | — | 0.3 | — | — | — | — | 0.1 | 92 | 97 | 100 | 57 | 98 | 99 |
| | No. 110 | — | 3.0 | — | — | 0.3 | — | — | 0.3 | — | — | 85 | 97 | 100 | 55 | 93 | 99 |
| | No. 111 | — | 3.0 | — | — | 0.3 | — | — | — | 0.3 | — | 69 | 96 | 100 | 56 | 92 | 99 |
| 4th | No. 112 | 2.0 | — | 0.3 | — | — | — | — | — | — | — | 92 | 94 | 100 | 50 | 88 | 98 |
| Comp. | No. 113 | 2.0 | — | — | 0.3 | — | — | — | — | — | — | 92 | 96 | 100 | 47 | 88 | 98 |
| Ex. | No. 114 | 2.0 | — | — | — | 0.3 | — | — | — | — | — | 88 | 96 | 100 | S0 | 90 | 99 |
| | No. 115 | 2.0 | — | — | — | — | 0.3 | — | — | — | — | 69 | 97 | 100 | 38 | 91 | 98 |

Examination for Purifying Performance

Each of the present catalysts and the comparative catalysts was disposed in an exhaust line of an actual vehicle equipped with a lean burn engine. The lean burn engine had a displacement of 1.6 liters. The vehicle was driven in the urban area running mode, for instance, it was alternately driven in the 10-mode for a certain period of time and then in the 15-mode for another certain period of time, thereby examining the present and comparative catalysts for the conversion of CO, HC and $NO_x$. The results of the evaluation were summarized in the columns designated at "Initial Conversion" in Table 6.

After the aforementioned evaluation, each of the present catalysts and the comparative catalysts was subjected to a bench test on durability which utilized the same type of engine as above. Namely, each of them was disposed in an exhaust line of the engine, and then the engine was run for 100 hours while adjusting the temperature of the exhaust gas introduced into them at 650° C. After this bench test was over, each of them was again disposed in the exhaust line of the actual vehicle. The vehicle was driven in the same manner as described above, thereby examining the present and comparative catalysts for the conversion of CO, HC and $NO_x$. The results of the evaluation were summarized in the columns designated at "Conversion after Durability Test" in Table 6.

Evaluation

It is appreciated from Table 6 that the present catalysts with an alkaline-earth metal ingredient and a rare-earth element ingredient loaded were improved in terms of the $NO_x$ conversion after the durability test over the comparative catalysts with one and only alkaline-earth metal ingredient loaded.

EIGHTH PREFERRED EMBODIMENTS

A plurality of honeycomb supports with Pt or Pd loaded were prepared in the same manner as described in the "First Preferred Embodiments" section. Then, each of the supports was first immersed into an aqueous solution which contains barium acetate in a predetermined concentration, and it was dried thereafter. Moreover, four aqueous solutions containing one of lithium nitrate, lanthanum nitrate, cerium nitrate and zirconium oxynitrate in predetermined concentrations were prepared in this order. Each of the supports was further immersed into the four aqueous solutions in the order of the preparation of the aqueous solutions, and it was dried thereafter repeatedly. Each of the five aqueous solutions was prepared by mixing the solutes with water so as to load the five ingredients in loading amounts set forth in Table 7 below. Each of the supports was then blown to blow away the water droplets in excess. After drying, each of the supports was burned at 600° C. for 1 hour, thereby completing each of the present catalysts designated at No. 116 through No. 121 in Table 7.

FIFTH COMPARATIVE EXAMPLES

Fifth Comparative Examples, e.g., comparative catalysts designated at No. 122 through No. 126 in Table 7 below, were prepared in the same manner as described in the "Eighth Preferred Embodiments" section except that either one of the five ingredients was not loaded thereon.

TABLE 7

|  |  | Loading Amount, Catalyst Ingredient (gram/liter) | | Loading Amount, Ingredient (mole/liter) | | | | | Initial Conversion (%) | | | Conversion after Durability Test (%) | | |
|---|---|---|---|---|---|---|---|---|---|---|---|---|---|---|
|  |  | Pt | Pd | Li | Zr | Ba | La | Ce | NOx | HC | CO | NOx | HC | CO |
| 8th | No. 116 | 2.0 | — | 0.2 | 0.1 | 0.5 | 0.2 | 9.5 | 91 | 93 | 98 | 71 | 95 | 99 |
| Pref. | No. 117 | — | 2.0 | 0.2 | 0.1 | 0.5 | 0.2 | 0.5 | 88 | 94 | 98 | 65 | 93 | 98 |
| Embodi- | No. 118 | 2.0 | — | 0.1 | 0.05 | 0.3 | 0.1 | 0.3 | 92 | 93 | 98 | 69 | 95 | 98 |
| ments | No. 119 | 2.0 | — | 0.05 | 0.05 | 0.3 | 0.1 | 0.2 | 91 | 92 | 97 | 65 | 95 | 98 |
|  | No. 120 | 2.0 | — | 9.2 | 0.1 | 0.5 | 0.2 | 0.5 | 91 | 95 | 97 | 70 | 93 | 99 |
|  | No. 121 | — | 2.0 | 0.2 | 0.1 | 0.5 | 0.2 | 0.5 | 88 | 96 | 98 | 66 | 90 | 99 |
| 5th | No. 122 | 2.0 | — | — | 0.1 | 0.5 | 0.2 | 0.5 | 93 | 91 | 99 | 45 | 93 | 99 |
| Comp. | No. 123 | 2.0 | — | 0.2 | — | 0.5 | 0.2 | 0.5 | 92 | 92 | 99 | 49 | 91 | 99 |
| Ex. | No. 124 | 2.0 | — | 0.2 | 0.1 | — | 0.2 | 0.5 | 73 | 93 | 98 | 35 | 91 | 99 |
|  | No. 125 | 2.0 | — | 0.2 | 0.1 | 0.5 | — | 0.5 | 91 | 93 | 95 | 52 | 99 | 99 |
|  | No. 126 | 2.0 | — | 0.2 | 0.1 | 0.5 | 0.2 | — | 85 | 94 | 94 | 53 | 91 | 98 |

Examination for Purifying Performance

Each of the present catalysts and the comparative catalysts was disposed in an exhaust line of an actual vehicle equipped with a lean burn engine. The lean burn engine had a displacement of 1.6 liters. The vehicle was driven in the urban area running mode, for instance, it was alternately driven in the 10-mode for a certain period of time and then in the 15-mode for another certain period of time, thereby examining the present and comparative catalysts for the conversion of CO, HC and $NO_x$. The results of the evaluation were summarized in the columns designated at "Initial Conversion" in Table 7.

After the aforementioned evaluation, each of the present catalysts and the comparative catalysts was subjected to a bench test on durability which utilized the same type of engine as above. Namely, each of them was disposed in an exhaust line of the engine, and then the engine was run for 100 hours while adjusting the temperature of the exhaust gas introduced into them at 650° C. After this bench test was over, each of them was again disposed in the exhaust line of the actual vehicle. The vehicle was driven in the same manner as described above, thereby examining the present and comparative catalysts for the conversion of CO, HC and $NO_x$. The results of the evaluation were summarized in the columns designated at "Conversion after Durability Test" in Table 7.

Evaluation

It is appreciated from Table 7 that the present catalysts with all of the five ingredients loaded were improved in terms of the $NO_x$ conversion after the durability test over the comparative catalysts lacking either one of the five ingredients.

Having now fully described the present invention, it will be apparent to one of ordinary skill in the art that many changes and modifications can be made thereto without departing from the spirit or scope of the present invention as set forth herein including the appended claims.

What is claimed is:

1. A process for purifying an exhaust gas from a lean burn engine comprising sulfur oxides, carbon monoxide, hydrocarbons and nitrogen oxides, said process comprising:

bringing said exhaust gas from a lean burn engine into contact with an exhaust gas purifying catalyst, the catalyst comprising:

a porous support;

at least one catalyst ingredient selected from the group consisting of Pt and Pd, and loaded on said porous support; and at least two NOx storage ingredients selected from the group consisting of La, Pr, Nd and Sm and loaded on said porous support, adsorbing nitrogen oxides in said exhaust gas to said at least two NOx storage ingredients on said porous support under a lean burn atmosphere in which oxidizing concentrations are above a stoichiometric point that is required for oxidizing components to be oxidized in said exhaust gas, and chemically decomposing said adsorbed nitrogen oxides to $N_2$ by a reaction with said at least one catalyst ingredient on said porous support and said hydrocarbons and carbon monoxide in said exhaust gas under a reduction atmosphere to which said lean burn atmosphere is temporarily changed and which is a fuel-rich atmosphere in which oxygen concentrations are below said stoichiometric point, wherein said sulfur oxides react with said at least two NOx storage ingredients to form sulfates, said sulfates decomposing to release $SO_2$ at decomposition temperatures lower than sulfates of the NOx storage ingredients individually, thereby regenerating said at least two ingredients for NOx storage.

2. A process for purifying an exhaust gas from a lean burn engine comprising sulfur oxides, carbon monoxide, hydrocarbons and nitrogen oxides, said process comprising:

bringing said exhaust gas from a lean burn engine into contact with an exhaust gas purifying catalyst, the catalyst comprising:

a porous support;

at least one catalyst ingredient selected from the group consisting of Pt and Pd, and loaded on said porous support;

at least one first NOx storage ingredient selected from the group consisting of La, Pr, Nd and Sm and loaded on said porous support; and at least one second NOx storage ingredient selected from the group consisting of Fe, Ni, Co and Mn, and loaded on said porous support, adsorbing nitrogen oxides in said exhaust gas to at least one of said at least one first ingredient or said at least one second ingredient on said porous support under a lean burn atmosphere in which oxidizing concentrations are above a stoichiometric point that is required for oxidizing components to be oxidized in said exhaust gas, and chemically decomposing said adsorbed nitrogen oxides to $N_2$ by a reaction with said at least one catalyst ingredient on said porous support and said hydrocarbons and carbon monoxide in said exhaust gas under a reduction atmosphere to which said lean burn atmosphere is temporarily changed and which ranges from a stoichiometric atmosphere to a fuel-rich atmosphere in which oxygen concentrations are below said stoichiometric point, wherein said sulfur oxides react with said first and second ingredients to form sulfates, said sulfates decomposing to release $SO_2$ at decomposition temperatures lower than sulfates of the NOx storage ingredients individually, thereby regenerating said first and second ingredients for NOx storage.

3. A process for purifying an exhaust gas from a lean burn engine comprising sulfur oxides, carbon monoxide, hydrocarbons and nitrogen oxides, said process comprising:

bringing said exhaust gas from a lean burn engine into contact with an exhaust gas purifying catalyst, the catalyst comprising:
  a porous support;
  at least one catalyst ingredient selected from the group consisting of Pt and Pd, and loaded on said porous support;
  at least one first NOx storage ingredient selected from the group consisting of Li, Na, K, Rb and Cs, and loaded on said porous support; and
  at least one second NOx storage ingredient selected from the group consisting of Fe, Ni, Co and Mn, and loaded on said porous support, adsorbing nitrogen oxides in said exhaust gas to at least one of said at least one first ingredient or said at least one second ingredient on said porous support under a lean burn atmosphere in which oxidizing concentrations are above a stoichiometric point that is required for oxidizing components to be oxidized in said exhaust gas, and chemically decomposing said adsorbed nitrogen oxides to $N_2$ by a reaction with said at least one catalyst ingredient on said porous support and said hydrocarbons and carbon monoxide in said exhaust gas under a reduction atmosphere to which said lean burn atmosphere is temporarily changed and which ranges from a stoichiometric atmosphere to a fuel-rich atmosphere in which oxygen concentrations are below said stoichiometric point, wherein said sulfur oxides react with said first and second ingredients to form sulfates, said sulfates decomposing to release $SO_2$ at decomposition temperatures lower than sulfates of the NOx storage ingredients individually, thereby regenerating said first and second ingredients for NOx storage.

4. A process for purifying an exhaust gas from a lean burn engine comprising sulfur oxides, carbon monoxide, hydrocarbons and nitrogen oxides, said process comprising:

bringing said exhaust gas from a lean burn engine into contact with an exhaust gas purifying catalyst comprising:
  a porous support;
  at least one catalyst ingredient selected from the group consisting of Pt and Pd, and loaded on said porous support; and
  at least two NOx storage ingredients selected from the group consisting of Ba, Mg, Ca and Sr, and loaded on said porous support, adsorbing nitrogen oxides in said exhaust gas to said at least two NOx storage ingredients on said porous support under a lean burn atmosphere in which oxidizing concentrations are above a stoichiometric point that is required for oxidizing components to be oxidized in said exhaust gas, and chemically decomposing said adsorbed nitrogen oxides to $N_2$ by a reaction with said at least one catalyst ingredient on said porous support and said hydrocarbons and carbon monoxide in said exhaust gas under a reduction atmosphere to which said lean burn atmosphere is temporarily changed and which ranges from a stoichiometric atmosphere to a fuel-rich atmosphere in which oxygen concentrations are below said stoichiometric point, wherein said sulfur oxides react with said at least two NOx storage ingredients to form sulfates, said sulfates decomposing to release $SO_2$ at decomposition temperatures lower than sulfates of the NOx storage ingredients individually, thereby regenerating said at least two ingredients for NOx storage.

5. A process for purifying an exhaust gas from a lean burn engine comprising sulfur oxides, carbon monoxide, hydrocarbons and nitrogen oxides, said process comprising:

bringing said exhaust gas from a lean burn engine into contact with an exhaust gas purifying catalyst comprising:
  a porous support;
  at least one catalyst ingredient selected from the group consisting of Pt and Pd, and loaded on said porous support;
  at least one first NOx storage ingredient selected from the group consisting of Ba, Mg, Ca and Sr, and loaded on said porous support; and
  at least one second NOx storage ingredient selected from the group consisting of La, Nd and Sm but excluding cerium, and loaded on said porous support, adsorbing nitrogen oxides in said exhaust gas to at least one of said at least one first ingredient or said at least one second ingredient on said porous support under a lean burn atmosphere in which oxidizing concentrations are above a stoichiometric point that is required for oxidizing components to be oxidized in said exhaust gas, and chemically decomposing said adsorbed nitrogen oxides to $N_2$ by a reaction with said at least one catalyst ingredient on said porous support and said hydrocarbons and carbon monoxide in said exhaust gas under a reduction atmosphere to which said lean burn atmosphere is temporarily changed and which is a fuel-rich atmosphere in which oxygen concentrations are below said stoichiometric point, wherein said sulfur oxides react with said first and second ingredients to form sulfates, said sulfates decomposing to release $SO_2$ at decomposition temperatures lower than sulfates of the NOx storage ingredients individually, thereby regenerating said first and second ingredients for NOx storage.

6. A process for purifying an exhaust gas from a lean burn engine comprising sulfur oxides, carbon monoxide, hydrocarbons and nitrogen oxides, said process comprising:

bringing said exhaust gas from a lean burn engine into contact with an exhaust gas purifying catalyst comprising:
  a porous support;
  at least one catalyst ingredient selected from the group consisting of Pt and Pd, and loaded on said porous support; and NOx storage ingredients comprising each of Ba, Li, La, Ce and Zr loaded on said porous support, adsorbing nitrogen oxides in said exhaust gas to said NOx storage ingredients on said porous support under a lean burn atmosphere in which oxidizing concentrations are above a stoichiometric point that is required for oxidizing components to be oxidized in said exhaust gas, and chemically decomposing said adsorbed nitrogen oxides to $N_2$ by a reaction with said at least one catalyst ingredient on said porous support and said hydrocarbons and carbon monoxide in said exhaust gas under a reduction atmosphere to which said lean burn atmosphere is temporarily changed and which ranges from a stoichiometric atmosphere to a fuel-rich atmosphere in which oxygen concentrations are below said stoichiometric point, wherein said sulfur oxides react with said NOx storage ingredients to form sulfates, said sulfates decomposing to release $SO_2$ at decomposition temperatures lower than sulfates of the NOx storage ingredients individually, thereby regenerating said ingredients for NOx storage.

* * * * *